(12) United States Patent
Zama

(10) Patent No.: US 7,099,456 B2
(45) Date of Patent: Aug. 29, 2006

(54) CALL CENTER SYSTEM

(75) Inventor: Shinichi Zama, Koriyama (JP)

(73) Assignee: Hitachi Telecom Technologies, Ltd., Koriyama (JP)

( * ) Notice: Subject to any disclaimer, the term of this patent is extended or adjusted under 35 U.S.C. 154(b) by 341 days.

(21) Appl. No.: 10/108,268

(22) Filed: Mar. 28, 2002

(65) Prior Publication Data

US 2003/0185382 A1    Oct. 2, 2003

(51) Int. Cl.
H04M 3/00 (2006.01)
H04M 5/00 (2006.01)
G06F 7/00 (2006.01)
G06F 17/30 (2006.01)

(52) U.S. Cl. .......................... 379/265.13; 379/265.01; 707/1; 707/5

(58) Field of Classification Search ........... 379/265.01, 379/265.12, 265.13, 265.04; 707/1, 5
See application file for complete search history.

(56) References Cited

U.S. PATENT DOCUMENTS

| | | | | | |
|---|---|---|---|---|---|
| 5,963,941 | A | * | 10/1999 | Hirakawa | ...................... 707/5 |
| 6,049,602 | A | * | 4/2000 | Foladare et al. | ....... 379/265.04 |
| 6,182,060 | B1 | * | 1/2001 | Hedgcock et al. | ............. 707/1 |
| 6,292,555 | B1 | * | 9/2001 | Okamoto | ............... 379/265.01 |
| 6,396,919 | B1 | * | 5/2002 | Shimada et al. | ....... 379/265.12 |
| 6,542,601 | B1 | * | 4/2003 | Hernandez et al. | .... 379/265.01 |

* cited by examiner

Primary Examiner—Wing Chan
Assistant Examiner—Thjuan P. Knowlin
(74) Attorney, Agent, or Firm—Foley & Lardner LLP

(57) ABSTRACT

Data on customer's purchase history stored in a database server is searched and edited by using an ID number inputted by a customer. A customer class, a customer rank, a discount rate, and the like are displayed on a personal computer of an operator who responds to the customer that calls a call center.

14 Claims, 12 Drawing Sheets

FIG.2

(1) SCREEN INDICATING INCOMING DATA FROM GENERAL CUSTOMER

| USER NAME |
|---|
| CUSTOMER RANK   GENERAL CUSTOMER |
| DISCOUNT RATE   2% |

→

LIST OF GOODS CONTENTS FOR GENERAL CUSTOMER

PR TALK     NEW PR-GOODS

(2) SCREEN INDICATING INCOMING DATA FROM LOYAL CUSTOMER

| USER NAME |
|---|
| CUSTOMER RANK    LOYAL CUSTOMER |
| DISCOUNT RATE   10% |

→

LIST OF GOODS CONTENTS FOR LOYAL CUSTOMER

PR TALK     NEW PR-GOODS

(3) SCREEN INDICATING INCOMING DATA FROM VIP

| USER NAME |
|---|
| CUSTOMER RANK       VIP |
| DISCOUNT RATE   20% |

→

LIST OF GOODS CONTENTS FOR VIP

PR TALK     NEW PR-GOODS

(4) SCREEN INDICATING FROM FIRST INCOMING DATA

| USER NAME |
|---|
| CUSTOMER RANK   GENERAL CUSTOMER |
| DISCOUNT RATE   0% |

→

(5) SCREEN OF CUSTOMER WHO FREQUENTLY COMPLAINS ABOUT GOODS

SCREEN INDICATING RESPONSE TO COMPLAINER

MANY COMPLAINTS FOR PAST RESPONSE

FIG.3

| CUSTOMER ID NO. | CUSTOMER NAME | PREVIOUS ACCESS | RESPONDING OPERATOR ID NO. | CUSTOMER RANK | COMPLAINT | CLASS OF PURCHASING GOODS ||||| PR GOODS |
|---|---|---|---|---|---|---|---|---|---|---|---|
| | | | | | | HOUSEHOLD APPLIANCES | FURNITURE | ACCESSORIES | CLOTHES | SPORTS | |
| 1000 | YOSHIO AIKAWA | 00/12/10 | 5000 | 1 | 0 | 5 | 1 | 2 | 3 | 1 | HOUSEHOLD APPLIANCES |
| 1001 | ICHIRO KAGEYAMA | 00/10/30 | 5005 | 1 | 0 | 2 | 3 | 0 | 0 | 0 | FURNITURE |
| 1002 | KAZUO SAKAMOTO | 00/11/01 | 5008 | 2 | 2 | 0 | 0 | 5 | 3 | 0 | ACCESSORIES |
| 1003 | AKIO TAKAHASHI | 00/10/11 | 5009 | 1 | 1 | 0 | 0 | 0 | 5 | 0 | CLOTHES |
| 1004 | KOUJI NAKAYAMA | 00/09/20 | 5002 | 3 | 0 | 0 | 0 | 0 | 0 | 6 | SPORTS |

FIG.4

| CUSTOMER ID NO. | GOODS NO. | GOODS NAME | PRICE | OPERATOR NAME | OPERATOR ID NO. | YEAR/MONTH/DAY | CLASS |
|---|---|---|---|---|---|---|---|
| 1000 | 0001 | HARD DISK | 10,000 | SATO | 5000 | 2000/10/01 | HOUSEHOLD APPLIANCES |
| 1000 | 0002 | FLOPPY DISK | 3,000 | KATO | 5005 | 2000/10/11 | HOUSEHOLD APPLIANCES |
| 1000 | 0003 | MAGNET-OPTIC DISK | 3,000 | SATO | 5000 | 2000/10/15 | HOUSEHOLD APPLIANCES |

FIG.5

| CUSTOMER ID NO. | NAME | SEX | AGE | BIRTHDAY | OCCUPATION | PAYMENT | FAMILY STRUCTURE | ADDRESS | TEL NO. | EMAIL ADDRESS |
|---|---|---|---|---|---|---|---|---|---|---|
| 1000 | YOSHIO AIKAWA | | | | | | | | | |
| 1001 | ICHIRO KAGEYAMA | | | | | | | | | |
| 1002 | KAZUO SAKAMOTO | | | | | | | | | |
| 1003 | AKIO TAKAHASHI | | | | | | | | | |
| 1004 | KOUJI NAKAYAMA | | | | | | | | | |

FIG.6

| OPERATOR ID NO. | NAME | SEX | AGE | RANK | POSITION | PASSWORD | ADDRESS | TEL NO. | EMAIL ADDRESS |
|---|---|---|---|---|---|---|---|---|---|
| 5000 | ICHIRO SATO | | | | | | | | |
| 5001 | HANAKO SUZUKI | | | | | | | | |
| 5002 | HANAE KINOSHITA | | | | | | | | |
| 5003 | TARO YAMAMOTO | | | | | | | | |

FIG.7

| CUSTOMER RANK | NO. OF INITIAL SCREEN | NO. OF SCREEN 1 | NO. OF SCREEN 2 | | NO. OF SCREEN n |
|---|---|---|---|---|---|
| 1 | 1 | | | | |
| 2 | 10 | | | | |
| 3 | 20 | | | | |
| 4 | 30 | | | | |
| 5 | 40 | | | | |

FIG.8

| CUSTOMER RANK | DISCOUNT RATE | SUM | CLASS |
|---|---|---|---|
| 1 | 0 | 0 | GENERAL |
| 2 | 2 | 100,000 | GENERAL |
| 3 | 5 | 200,000 | GENERAL |
| 4 | 7 | 500,000 | LOYAL |
| 5 | 10 | 1,000,000 | LOYAL |
| 6 | 20 | 1,500,000 | VIP |
| 7 | 25 | 2,000,000 | VIP |

# CALL CENTER SYSTEM

BACKGROUND OF THE INVENTION

1. Field of the Invention

The present invention relates to a call center system in which an operator responds to calls from many customers.

2. Description of the Related Art

Conventionally, when an operator responds to calls from customers, all the customers view a common screen displayed on a monitor device of a data terminal device of the operator.

However, in the above conventional call center system, a first customer cannot be discriminated separately from a customer as a heavy user and a single response is therefore performed for the customers.

SUMMARY OF THE INVENTION

Accordingly, it is an object of the present invention to form a screen displayed on a monitor device, which reflects the history of a customer, when an operator responds to a call from the customer.

To accomplish the object, according to an aspect of the present invention, there is provided a call center system, comprising: means for identifying a customer based on a customer identification number which is inputted by the customer; and means for storing past customer information in a database, wherein when a customer call is incoming and the customer identification number is inputted, the customer information stored in the database is searched, incoming customer data is edited, a screen is formed corresponding to the customer, and the screen is displayed on a monitor device of an operator.

In the call center system of the present invention, the information on the customer can automatically be displayed on the monitor device of the operator only by customer's input of the customer identification number.

Preferably, the call center system may have a caller number detecting function for authenticating the customer by comparing a caller number with the customer identification number.

In the call center system of the present invention, the customer can be authenticated by the caller number detecting function for detecting the caller number.

Preferably, in the call center system, when the caller number does not match the customer identification number, the customer may be authenticated by customer's input of a password.

In the call center system of the present invention, the customer can be authenticated from even the call from the unregistered telephone.

Preferably, in the call center system, when the customer identification number is not inputted and the caller number is not registered in the database, the customer may be determined as a new customer and may be connected to the operator.

In the call center system of the present invention, the new customer can easily be identified by managing both the customer identification number and the caller number.

Preferably, in the call center system, when the inputted customer identification number is not registered in the database, the customer may be assumed as a new customer and be registered based on customer's instruction, and the customer identification number may be notified to a caller by voice.

In the call center system of the present invention, when the new customer inputs the customer identification number which has never been registered, the customer identification number can automatically be registered and notified to the new customer.

Preferably, in the call center system, when the customer identification number is not inputted but the caller number is registered in the database, the customer identification number may be searched from caller numbers and the customer identification number may be notified to a caller by voice.

In the call center system of the present invention, when the customer who forgets the customer identification number calls the call center from the registered telephone, the customer identification number can be notified from the call center.

Preferably, in the call center system, when the customer inputs the customer identification number, a previously responding operator may be searched from the database and be identified based on the customer identification number, and the customer may be connected to the previously responding operator.

In the call center system of the present invention, the customer can automatically be connected to the previously responding operator.

Preferably, in the call center system, when the customer inputs a signal indicating that he desires the communication with a previously responding operator, the previously responding operator may be searched from the database and be identified based on the customer identification number, and the customer may be connected to the previously responding operator.

In the call center system of the present invention, the customer can automatically be connected to the previously-responding operator by the operation for communication therewith.

Preferably, in the call center system, when the customer inputs a signal indicating that he does not desire the communication with a previously responding operator, the previously-responding operator is searched from the database and is identified from the customer identification number and the customer is connected to an operator other than the previously responding operator.

In the call center system of the present invention, when the operator evades the previously responding operator, he can automatically be connected to an operator other than the previously-responding operator.

Preferably, in the call center system, if the customer is connected to the previously responding operator and, then, the operator is being communicated, a guidance indicating the call back may be transmitted by voice, the call may be connected, and the previously responding operator may call back the customer later.

In the call center system of the present invention, when the designated operator is being communicated, the connection is temporarily disconnected not via the operator and the designated operator can call back the customer later.

Preferably, in the call center system, the customer may access a world wide web server via the Internet from any desired personal computer on the Internet, a database server may be controlled under the control of the world wide web server, and personal data may be registered to the database.

In the call center system of the present invention, a customer can register himself to the database via the Internet by using a personal computer.

BRIEF DESCRIPTION OF THE DRAWINGS

FIG. 2 includes diagrams showing examples of a personal computer (PC) of an operator;

FIG. 3 is a diagram showing data of customer's profile;

FIG. 4 is a diagram showing data of a goods purchasing history for each customer;

FIG. 5 is a diagram showing registered data of the customer;

FIG. 6 is a diagram showing registered data of the operator;

FIG. 7 is a diagram showing a registration list of screen patterns for each customer rank on the screen;

FIG. 8 is a diagram showing an example of a relationship between customer ranks and classes;

DESCRIPTION OF THE PREFERRED EMBODIMENT

Figure 1:
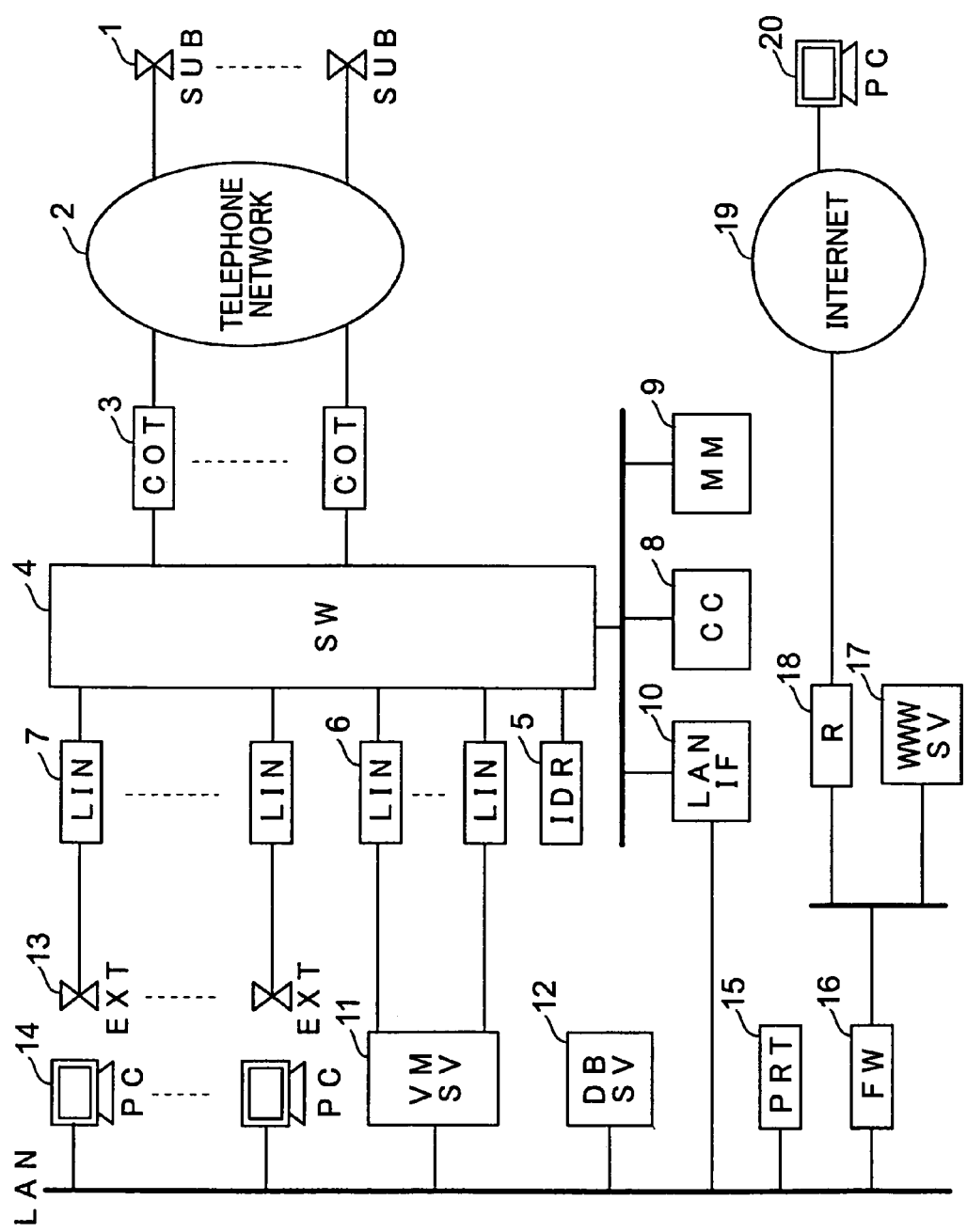
FIG. 1 is a block diagram showing the structure of a call center system according to an embodiment of the present invention.

FIG. 1 shows the diagram showing the structure of a call center system according to an embodiment of the present invention.

Referring to FIG. 1, reference numeral 1 denotes a subscriber phone SUB, reference numeral 2 denotes a telephone network as a public communication network, and reference numeral 3 denotes a station trunk line COT of an internal switch of an analog line or a digital one.

Reference numeral 4 denotes a switch SW of the internal switch, reference numeral 5 denotes a caller-No. register IDR for receiving a caller No. when the station trunk line COT 3 is the analog line, reference numeral 6 denotes a line circuit LIN for voice response, and reference numeral 7 denotes a line circuit LIN for operator's communication.

Reference numeral 8 denotes a central control device CC of the internal switch, reference numeral 9 denotes a main memory MM, reference numeral 10 denotes a local area network interface LANIF for connecting the central control device CC 8 to a local area network LAN, reference numeral 11 denotes a voice email server VMSV for voice response, etc., and reference numeral 12 denotes a database server DBSV for storing, searching, or editing various data.

Reference numeral 13 denotes an extension telephone EXT for operator's communication, and reference numeral 14 denotes a personal computer PC as a monitor device, for displaying customer data to an operator as a pair of the internal phone EXT 13.

Reference numeral 15 denotes a printer PRT, reference numeral 16 denotes a firewall FW for preventing the illegal invasion via the Internet, reference numeral 17 denotes a world wide web server WWWSV, reference numeral 18 denotes a rooter R, reference numeral 19 denotes the Internet, and reference numeral 20 denotes customer's personal computer PC.

FIG. 2 includes diagrams showing examples of screen contents displayed on a monitor device of a personal computer PC (hereinafter, referred to as a PC) 14 which is used as a data terminal device by a responding operator in the case of incoming data from the customer. Referring to FIG. 2, customer ranks are classified into a general customer, a loyal customer, and a VIP depending on the past transaction, together with a user name and a discount rate of goods. This display screen shifts to that shown in the right in the figure by the operator. In the case of the customer who frequently complains about the goods, the display screen shifts to a screen shown in an example in the numeral (5) screen shown in FIG. 2.

FIGS. 3 to 8 are examples of customer data and operator data which are stored in a database. Referring to FIG. 3, there are a customer identification ID number (hereinafter, referred to as a customer ID No.), a customer name, a previous access day, a responding-operator identification ID number (hereinafter, referred to as an operator ID No.), a customer rank, the number of complaining times, the number of purchasing times for each classified purchased goods, PR goods which are frequently purchased, and the like.

Referring to FIG. 4, a list of purchased goods histories for customer ID Nos. is formed.

Referring to FIG. 5, a customer registering list includes every customer ID No., a name, sex, age, birthday used as a password, occupation, payment, family structure, address, telephone No., and email address for sending the guidance of goods.

Referring to FIG. 6, an operator list includes every operator ID No., name, sex, age, rank of the operator, position, password, address, telephone No. and email address.

Referring to FIG. 7, a list of monitor screens displayed to the operator includes every customer's rank a plurality of kinds of screens, in addition to the initial screen. The operator selects and displays one of the screens depending on the situation so as to respond to the customer.

FIG. 8 shows a customer rank list. Referring to FIG. 8, the customer rank and the discount rate are determined depending on the sum of past payments. Further, the customer rank is classified to three ranks of a general customer, a loyal customer, and a VIP.

Data in FIGS. 3 to 8 is stored in the database, and a screen displayed to the operator is edited based on the data.

The outline of the operation will be described with reference to FIG. 9. The customer calls the call center by the subscriber telephone SUB 1 shown in FIG. 1 and then the call is received by the station trunk line COT 3 of the internal switch via the telephone network 2 (step S101). In the case of the digital station line, the central control device CC 8 receives a caller number (hereinafter, referred to as a caller ID No.) (step S102). In the case of the analog station line, the central control device CC 8 connects the station trunk line COT 3 to the call No. register IDR 5 via the switch SW 4, the caller No. register IDR 5 detects the caller ID No., and the central control device CC 8 receives the detected caller ID No.

Next, the central control device CC 8 connects the station trunk line COT 3 to the line circuit LIN 6 via the switch SW 4, and transfers incoming information to the voice email server VMSV 11 via the local area network interface LANIF 10.

The voice email server VMSV 11 transmits to the designated line circuit LIN 6, a customer ID No. requesting guidance, e.g., "Thank you for your use. We are XXX Co., Ltd. Input your ID No." (step S103).

The customer who has heard the guidance inputs his ID No. (step S104). The voice email server VMSV 11 checks the input ID No. (step S105). The processing in step S105 will be described in detail later with reference to FIG. 10.

When the customer ID No. is checked, the operator is selected (step S106). The processing in step S106 will also be described in detail later with reference to FIG. 11.

When the call customer is checked and a responding operator is determined, the incoming information is transmitted to the database server DBSV 12 (step S107).

The database server DBSV 12 receives the incoming information (step S108). Then, the database server DBSV 12 selects the display screen corresponding to the customer rank and edits the screen by using the data stored in the database (step S109). The processing in step S109 will further be described in detail later with reference to FIG. 12.

When the editing of the screen is completed, the operator is called (step S110). The processing in step S110 will further be described in detail later with reference to FIG. 13.

When the operator is called, the edited screen is displayed on the screen of the operator's PC 14 (step S111).

By performing the above operation, the screen corresponding to the customer rank can be displayed on the personal computer PC 14 of the operator which is desired by the customer.

The processing in step S105 in FIG. 9 will be described in detail with reference to FIG. 10.

It is determined based on the voice email server VMSV 11 whether or not the customer ID No. is inputted (step S201). If it is determined in step S201 that the customer ID No. is inputted, it is determined whether or not the input ID No. is registered in the database shown in FIG. 5 (step S202). If it is determined in step S202 that the input ID No. is registered, it is determined whether or not the caller ID No. matches the registered telephone number shown in FIG. 5 (step S203). If it is determined that the caller ID No. matches the registered telephone number, it is determined that the customer himself calls and, then, the processing routine advances to step S106 in FIG. 9.

If it is determined in step S203 that the caller ID No. does not the registered telephone number, the customer is checked by using the password because the customer might call the call center by another telephone. According to the embodiment, the birthday is used as the password. Therefore, if the caller ID No. does not correspond to the registered telephone number, the voice guidance to input the birthday is transmitted to the customer (step S204).

The client inputs the birthday (step S205). Then, it is determined whether or not the input birthday matches the birthday in the customer registered data shown in FIG. 5 (step S206). If YES in step S206, it is determined that the caller ID No. is regular and, then, the processing routine advances to step S106 in FIG. 9.

If NO in step S206, it is determined that the caller ID No. is not regular, then, a guidance indicating that the services cannot be presented is presented (step S207), and the processing routine ends.

If NO in step S202, an ID No. registering guidance, e.g., "The input ID No. is not registered. When newly registering your ID No., input "0#", or when inputting your ID No. again, input "1#"" is inputted to confirm whether or not the customer registers his ID No. (step S213). If it is determined that the customer registers his ID No., namely, "0#" is dialed (step S214), an ID No. is additionally registered in the database shown in FIG. 5 when the input ID No. is not registered (step S215). Then, the input ID No. is repeated, for example, a message of "Your ID No. is XXXX. This ID No. is necessary when you call us from now. So write this ID No. on the paper." is transmitted and it is notified that the registration is completed (step S216). The customer is connected to the operator (step S210).

When it is desired in step S214 that the ID No. is inputted again, that is, "#1" is dialed, the processing routine returns to step S104 whereupon the ID No. is inputted again.

If the ID No. is not inputted in step S201 after predetermined time, the caller ID No. is searched from the telephone numbers shown in FIG. 5 (step S208). If the caller ID No. is not found, the customer is determined as a new one (step S209). The customer is connected to the operator (step S210).

If the caller ID No. is found from the telephone numbers shown in FIG. 5 in step S209, it is determined that the customer forgets his ID No. and the customer ID No. is searched from the caller ID Nos. (step S211). The ID No. is notified to the customer by voice (step S212). The processing routine returns to step S104 whereupon the operation for inputting the ID No. is waited.

A series of ID No. checking processing is performed as mentioned above.

Figure 11:
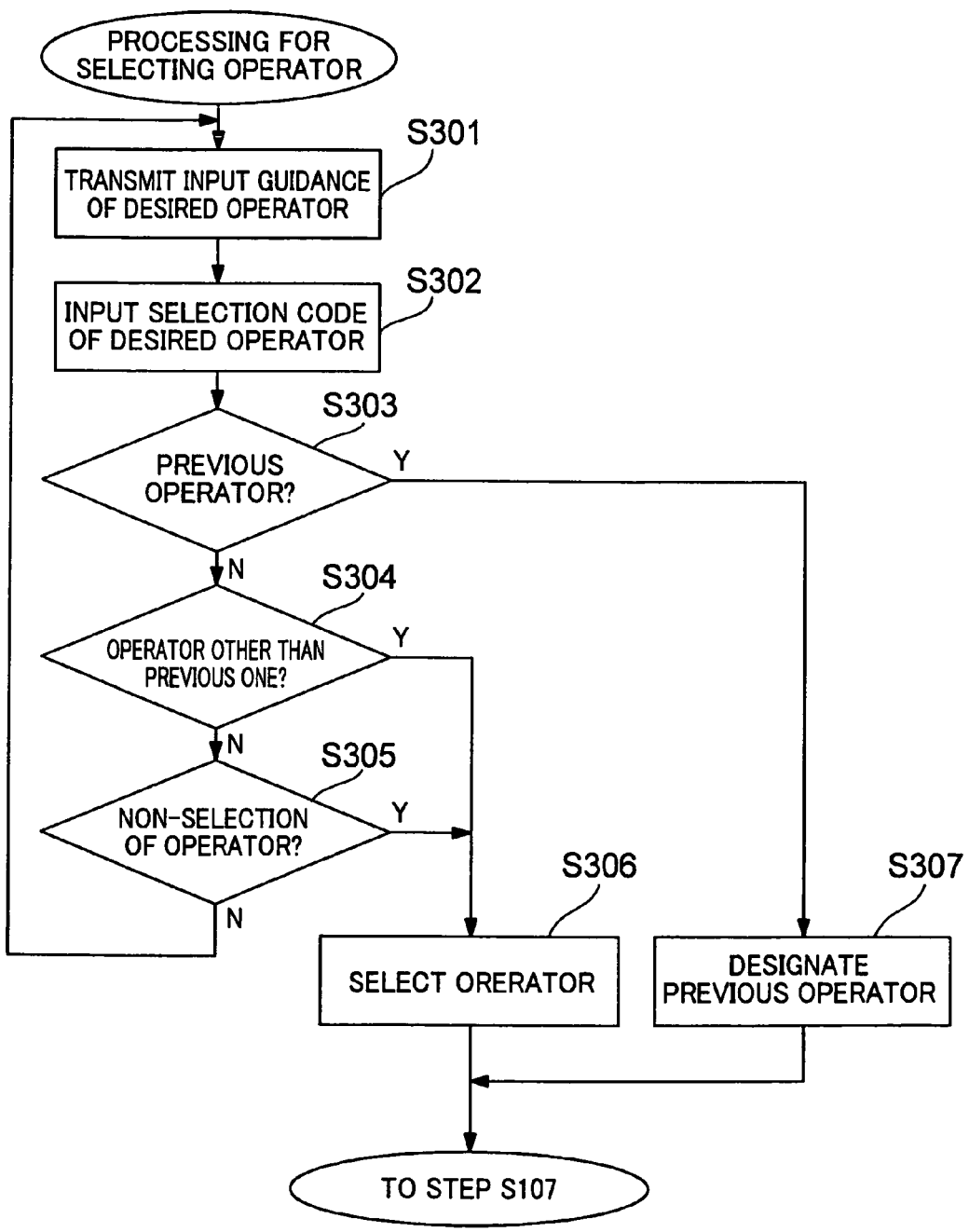
FIG. 11 is a flowchart for processing for setting an operator.

Next, the processing for selecting the operator in step S106 in FIG. 9 will be described in detail with reference to FIG. 11.

Since a plurality of operators exist in the call center, the customer can select the operator. In general, if the operator is a previous responding one, advantageously, the customer easily talks to the operator. Therefore, the customer is connected to the previous operator. Although the customer desires the previous operator as mentioned above, he desires another operator because the response of the operator is not preferable. Alternatively, the customer does not desire to wait for the response and any operator is OK for him.

Then, as an input guidance of the desired operator, for example, the following message is transmitted. That is, dial "1#" when you desires the previous operator, dial "2#" when you desires another operator, or dial "3#" when any operator is OK" (step S301).

When the customer dials the telephone (step S302), the call is received and it is determined whether or not the input dial is "1#" in step S303. If it is determined that the input dial is "1#", the previous operator is designated (step S307) and the processing routine advances to step S107.

If the input dial is not "1#" in step S303, it is determined in step S304 whether or not the input dial is "2#". If YES in step S304, the processing routine advances to step S306 whereupon one of free operators excluding the previous operator is selected. Then, the processing routine advances to step S107.

If the input dial "3#", the processing routine advances to step S305 whereupon one of free operators among all operators is selected. Then, the processing routine advances to step S107.

The processing for selecting and editing the screen in step S109 in FIG. 9 will be described in detail with reference to FIG. 12.

Figure 12:
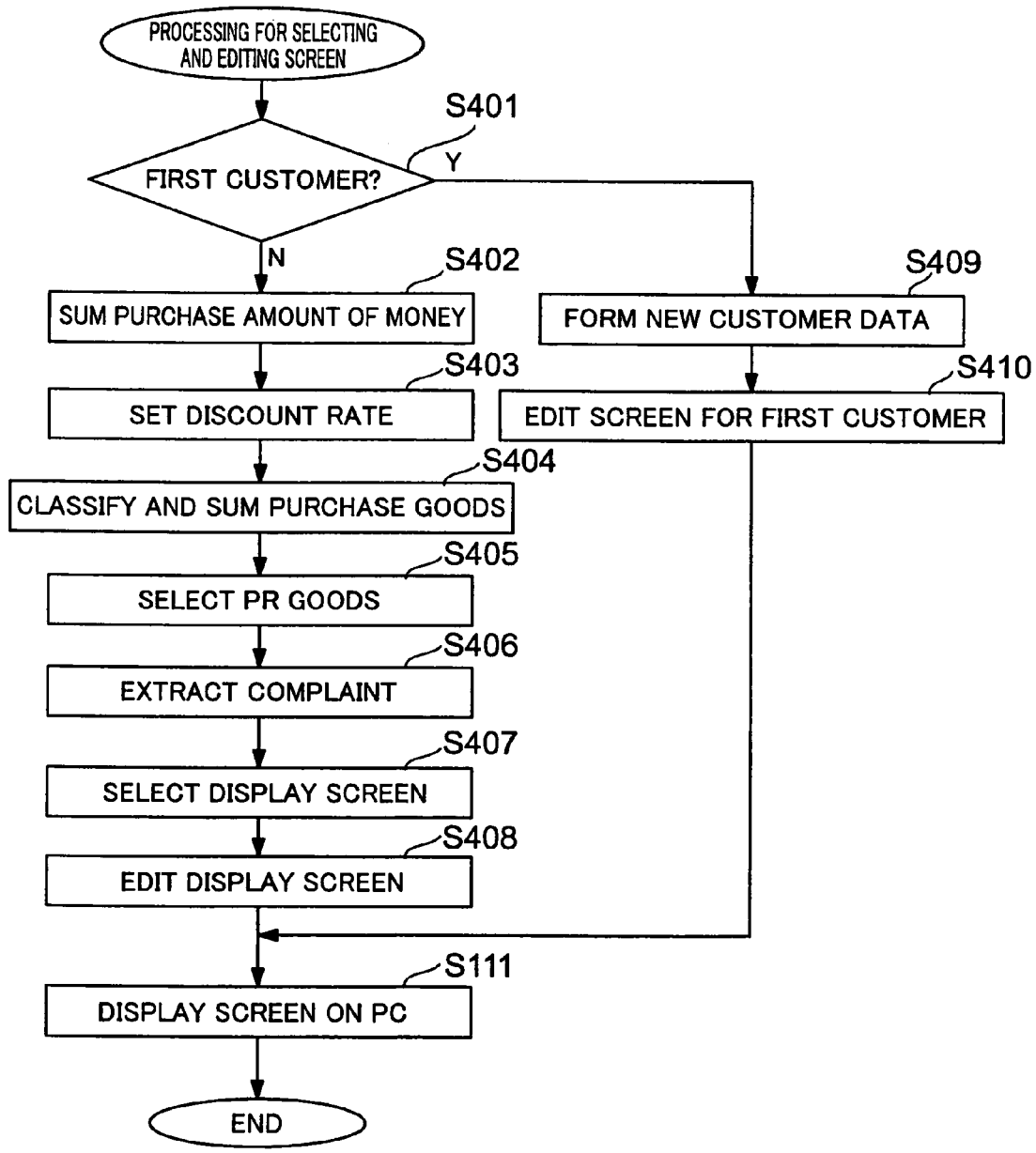
FIG. 12 is a flowchart for processing for selecting and editing the screen.

Referring to FIG. 12, it is determined depending on whether or not the customer is registered in the database shown in FIG. 5, whether or not the customer is a first customer (step S401).

If NO in step S401, the prices of the purchased goods shown in FIG. 4 are summed (step S402), and the discount rate is set with reference to the data shown in FIG. 8 (step S403).

The classes of the purchased goods are added with reference to FIG. 4 and the classified data of the purchased goods shown in FIG. 3 is updated (step S404). Then, the PR goods are selected (step S405).

The complaint situation is extracted (step S406), and data on the complaint is collected.

After the above-described data is collected, the initial screen number is selected from the list shown in FIG. 7 and the display screen is selected (step S407). The display screen is edited by using the collected data (step S408).

Figure 9:
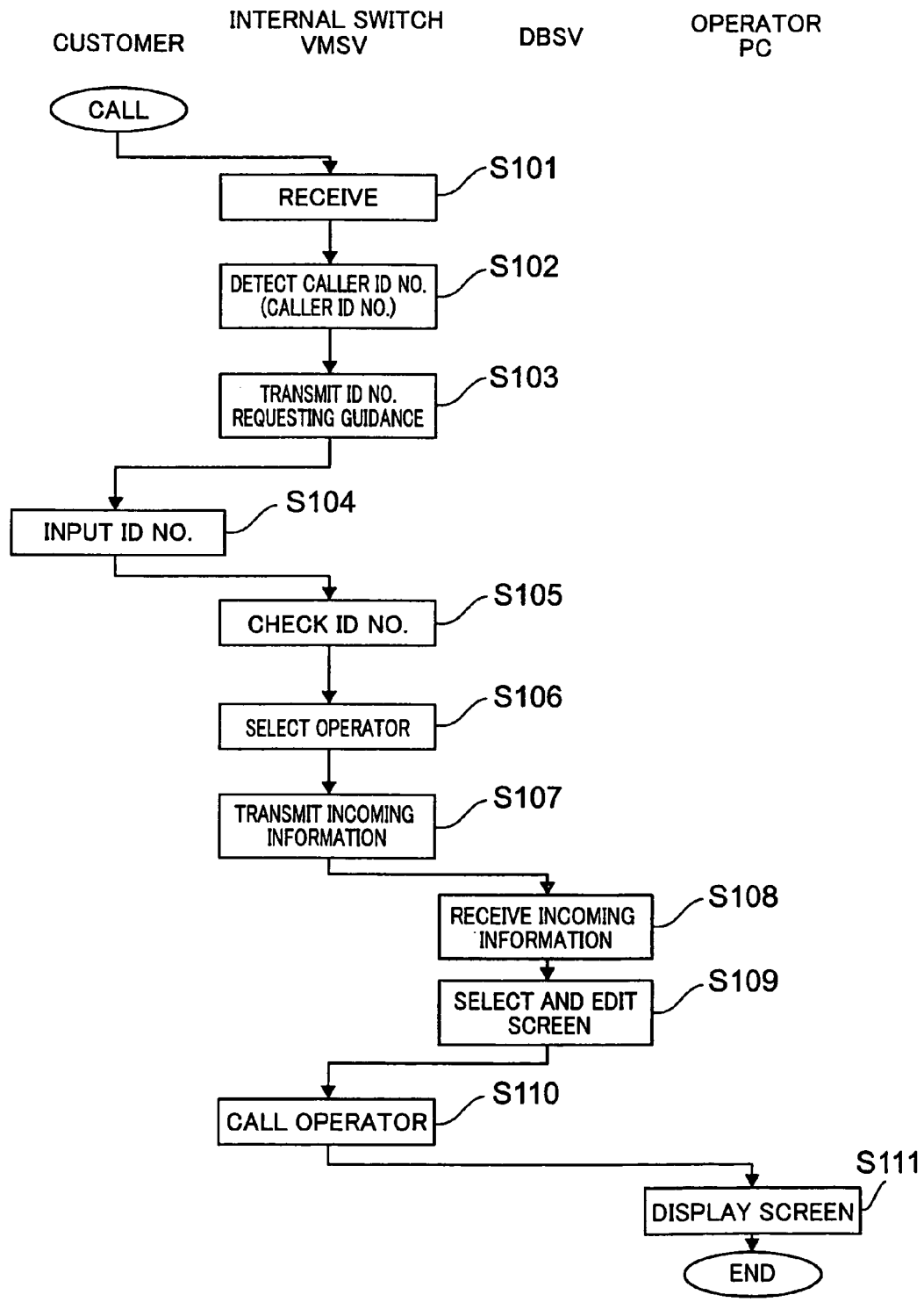
FIG. 9 is a flowchart for the processing routine for changing a display screen every customer.
Figure 10:
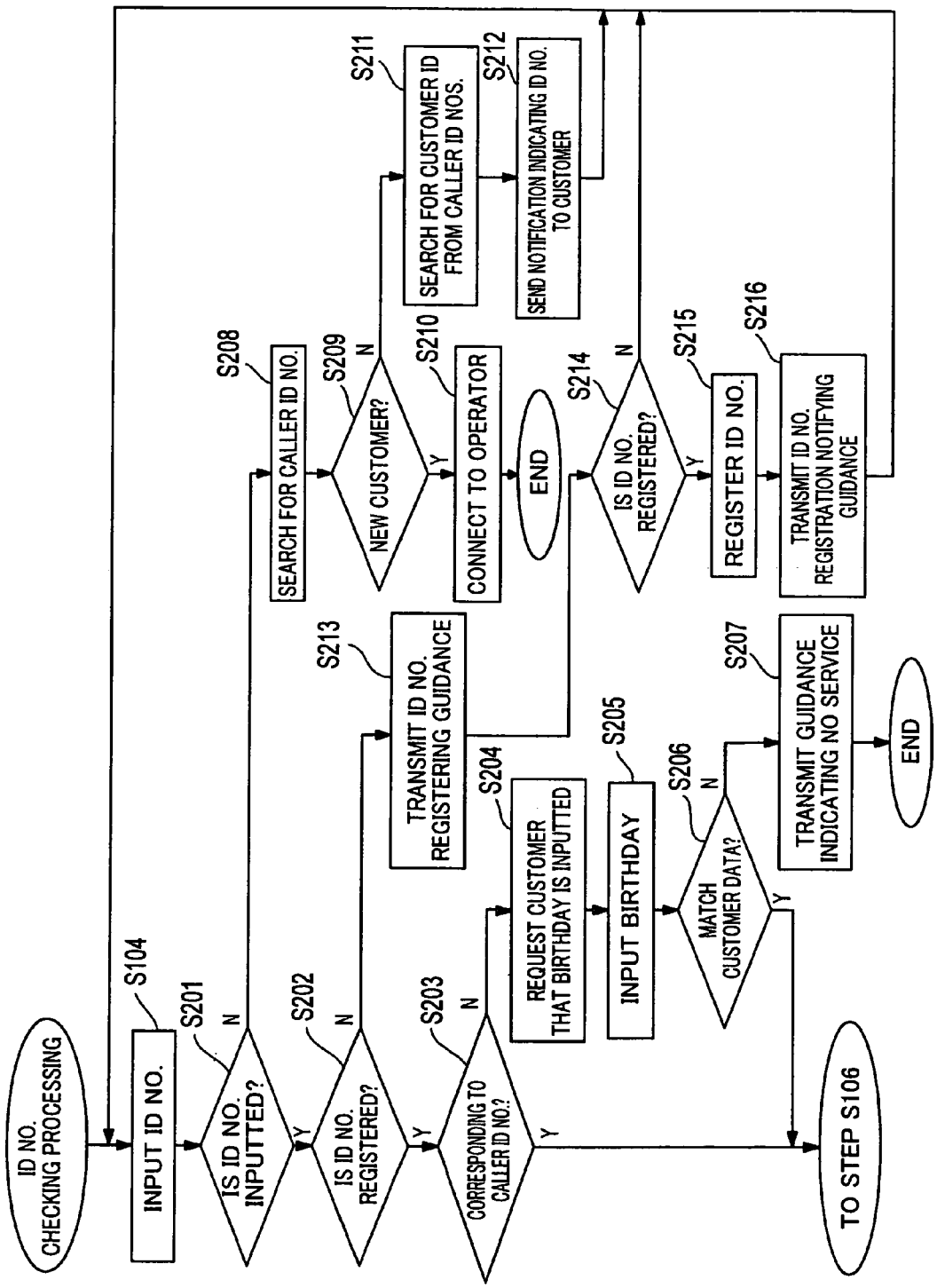
FIG. 10 is a flowchart for processing for checking an ID number.

The above-edited screen corresponding to the customer is displayed on the PC 14 of the called operator (step S111 in FIG. 9).

If it is determined in step S401 that the customer is the first customer, the operator inputs the data of the new customer and forms new-customer data while responding to the customer (step S409).

After the data formation is completed, the screen for the first customer is edited (step S410). The edited screen is displayed on the PC 14 of the operator (step S111 in FIG. 9).

Figure 13:
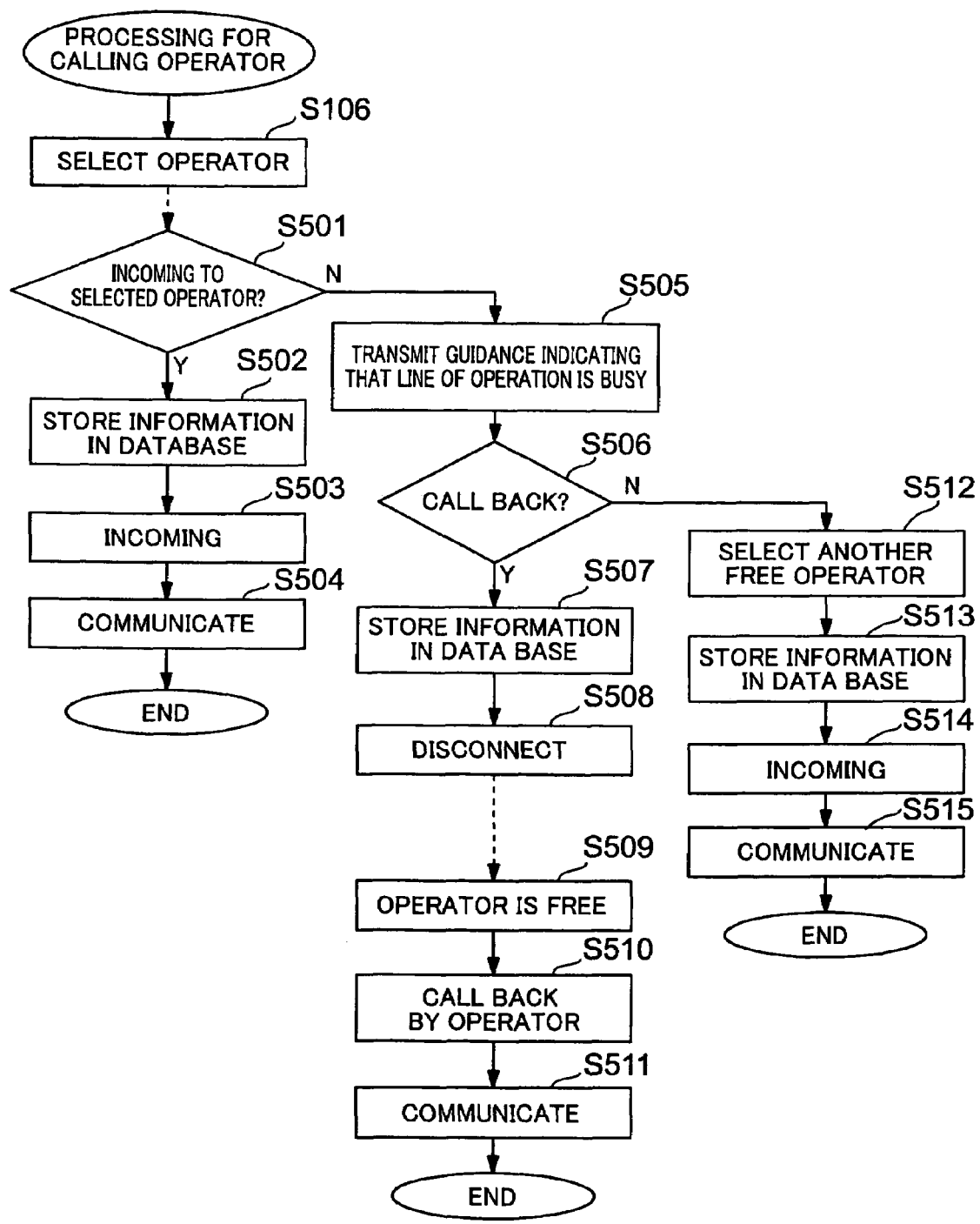
FIG. 13 is a flowchart for processing for calling the operator.

The processing for calling the operator in step S110 in FIG. 9 will be described in detail with reference to FIG. 13.

Since the operator is selected in step S106 in FIG. 9, it is determined whether or not the customer can call the selected operator, that is, whether or not the operator is in such a state that the line is busy and the customer cannot be connected to the operator (step S501). If it is determined that the customer can call the selected operator, information on the operator is stored in the database (step S502). Then, the customer calls the operator, thereby being connected to the operator (step S503). The operator answers the customer call and communicates with the customer (step S504).

If the operator selected in step S501 cannot respond to the customer because the line is busy or the like, a guidance indicating that the operator is being communicated is transmitted. For example, a message of "The operator is being communicated. If you desires the connection to another operator, dial "1#". If you desires the call back from the operator, dial "2#"" is transmitted (step S505).

If "1#" is dialed and the customer is connected to another operator, the customer selects one free operator from other operators (step S512). When the operator is determined, information on the operator is stored in the database (step S513). The customer calls the determined operator and, then, he is connected to the operator (step S514). The determined operator responds to the call from the customer and is then communicated with the customer (step S515).

If the customer dials "2#" and desires the call back from the operator in step S506, information on the operator and information on the desires of the call back are stored in the database (step S507). The call is temporarily disconnected (step S508).

After predetermined time, the selected operator becomes free (step S509). Then, the operator calls back the customer based on the customer name, the telephone number, and the call-back request which are displayed on the PC 14, in the database (step S510). The customer responds to the call from the operator and, then, he communicates with the operator (step S511).

When the operator communicates with the customer as mentioned above, the contents shown in the left in FIGS. 2A to 2C are displayed on the personal computer PC 14 of the operator and the operator can know the customer name, the customer rank, and the discount rate.

In the above description, it is assumed that the operator responds to the first customer and inputs the customer data. However, the customer can register the customer ID No. from the personal computer PC 20 and can input another customer data by accessing the world wide web server WWWSV 17 from the personal computer PC 20 via the Internet 19 and the rooter R 18 and by controlling the database server DBSV 12 via the firewall FW 16.

In the present invention, the basic data for each customer can be displayed to the operator when the operator in the call center responds to the customer. Therefore, advantageously, the operator can smoothly communicate with the customer.

What is claimed is:

1. A call center system, comprising:
    a telephone private branch exchange connected to a telephone network;
    a telephone connected to said telephone private branch exchange in order to be used by an operator;
    a voice server connected to said telephone private branch exchange;
    a database server for accumulating past customer information of a customer; and
    an operator terminal to be used by said operator;
    wherein said telephone private branch exchange, said voice server, said database server and said operator terminal are connected to each other through a local area network,
    wherein said telephone private branch exchange includes:
    a communication access part for establishing an access with said voice server upon detection of a communication access from said customer according to a call from said telephone network;
    wherein said voice server includes:
    a customer identification number detection part for requesting the customer to input a customer identification number identifying the customer upon detection of the call from said customer through said communication access part and for detecting the customer identification number inputted according to said request;
    a selecting part for selecting a responding operator responding to said call; and
    a notifying part for notifying said database server of said customer identification number detected by said customer identification number detection part; and
    wherein said database server includes:
    a screen editing/preparing part for searching the customer information of the customer corresponding to said customer identification number upon detection of the customer identification number from said notifying part, determining a customer rank according to a past purchase amount included in said customer information, and editing/preparing a screen corresponding to the customer rank of said customer; and
    a display control part for displaying the screen prepared by said screen editing/preparing part on a monitor of the operator terminal to be used by the responding operator responding to the call upon calling the telephone to be used by the responding operator selected by said selecting part.

2. A call center system according to claim 1, wherein said system has a caller number detecting function for authenticating the customer by comparing a caller number with said customer identification number.

3. A call center system according to claim 2, wherein when said caller number does not match said customer identification number, the customer is authenticated by customer's input of a password.

4. A call center system according to claim 2, wherein when said customer identification number is not inputted and said caller number is not registered in the database, the customer is determined as a new customer and is connected to the operator.

5. A call center system according to claim 1, wherein when the inputted customer identification number is not registered in the database, the customer is assumed as a new customer and is registered based on customer's instruction, and the customer identification number is notified to a caller by voice.

6. A call center system according to claim 2, wherein when the customer identification number is not inputted but the caller number is registered in the database, the customer identification number is searched from caller numbers and the customer identification number is notified to a caller by voice.

7. A call center system according to claim 1, wherein when the customer inputs the customer identification number, a previously responding operator is searched from the database and is identified based on the customer identification number, and the customer is connected to said previously responding operator.

8. A call center system according to claim 1, wherein when the customer inputs a signal indicating that the customer desires the communication with a previously responding operator, said previously responding operator is searched from the database and is identified based on the customer identification number, and the customer is connected to said previously responding operator.

9. A call center system according to claim 1, wherein when the customer inputs a signal indicating that the customer does not desire the communication with a previously responding operator, the previously-responding operator is searched from the database and is identified from the customer identification number and the customer is connected to an operator other than said previously responding operator.

10. A call center system according to claim 7, wherein if the customer is connected to the previously responding operator and, then, the operator is being communicated, a guidance indicating the call back is transmitted by voice, the call is connected, and said previously responding operator calls back said customer later.

11. A call center system according to claim 1, wherein the customer accesses a world wide web server via the Internet from any desired personal computer on the Internet, a database server is controlled under the control of said world wide web server, and personal data is registered to the database.

12. A call center system according to claim 8, wherein if the customer is connected to the previously responding operator and, then, the operator is being communicated, a guidance indicating the call back is transmitted by voice, the call is connected, and said previously responding operator calls back said customer later.

13. A call center system according to claim 1, wherein said customer identification number is different from a caller number used for communication access by the customer.

14. A call center method, comprising:
   establishing, by a telephone branch exchange, an access with a voice server upon detection of a communication access from a customer according to a call from a telephone network;
   requesting, by a voice server communicatively connected to the telephone branch exchange via a local area network, the customer to input a customer identification number identifying the customer upon detection of the call from the customer;
   detecting, by the voice server, the customer identification number inputted according to the request made in the requesting step;
   selecting, by the voice server, a responding operator responding to the call;
   notifying, by the voice server a database server of the customer identification number that is detected, the database server being communicatively connected to the voice server via the local area network;
   searching, by the database server, the customer information of the customer corresponding to the customer identification number upon detection of the customer identification number by the detecting step;
   determining, by the database server, a customer rank according to a past purchase amount included in the customer information;
   editing/preparing, by the database server, a screen corresponding to the customer rank of the customer; and
   displaying, by the database server, the edited/prepared screen on a monitor of an operator terminal responding to the call upon calling the telephone to be used by the responding operator selected by the selecting step.

* * * * *